(12) United States Patent
Hagström et al.

(10) Patent No.: US 12,257,510 B2
(45) Date of Patent: Mar. 25, 2025

(54) COMPUTER GAME SOFTWARE DOWNLOADING

(71) Applicant: Ningbo Geely Automobile Research & Development Co., Ltd., Ningbo (CN)

(72) Inventors: Albin Hagström, Lödöse (SE); Magnus Nilsson, Floda (SE)

(73) Assignee: Ningbo Geely Automobile Research & Dev. Co., Ltd., Ningbo (CN)

( * ) Notice: Subject to any disclaimer, the term of this patent is extended or adjusted under 35 U.S.C. 154(b) by 598 days.

(21) Appl. No.: 17/515,504

(22) Filed: Oct. 31, 2021

(65) Prior Publication Data

US 2022/0047952 A1  Feb. 17, 2022

Related U.S. Application Data

(63) Continuation of application No. PCT/CN2020/086476, filed on Apr. 23, 2020.

(30) Foreign Application Priority Data

May 7, 2019 (EP) ..................... 19173189

(51) Int. Cl.
*A63F 13/77* (2014.01)
*A63F 13/355* (2014.01)
*G06F 8/60* (2018.01)

(52) U.S. Cl.
CPC ............ *A63F 13/77* (2014.09); *A63F 13/355* (2014.09); *G06F 8/60* (2013.01); *A63F 2300/538* (2013.01); *A63F 2300/552* (2013.01)

(58) Field of Classification Search
CPC .. A63F 13/77; A63F 13/355; A63F 2300/538; A63F 2300/552; G06F 8/60
See application file for complete search history.

(56) References Cited

U.S. PATENT DOCUMENTS

| 2007/0066395 | A1* | 3/2007 | Harris | A63F 13/12 463/39 |
| 2008/0201227 | A1* | 8/2008 | Bakewell | G06Q 30/02 705/14.19 |
| 2008/0293486 | A1 | 11/2008 | Newcombe | |

(Continued)

FOREIGN PATENT DOCUMENTS

| CN | 103186399 A | 7/2013 |
| CN | 105988809 A | 10/2016 |

(Continued)

OTHER PUBLICATIONS

International Search Report from corresponding International Application No. PCT/CN2020/086476, dated Jul. 22, 2020, 2 pages.

*Primary Examiner* — William H McCulloch, Jr.
*Assistant Examiner* — Ankit B Doshi
(74) *Attorney, Agent, or Firm* — Tucker Ellis LLP

(57) ABSTRACT

A method for a gaming device of a vehicle includes acquiring time information of a journey, acquiring an indication of a selected computer game for the journey, determining based on the time information of the journey a remaining time period to a specific point in time associated with the journey, and determining based on the remaining time period to the specific point in time associated with the journey an extent of the computer software for the selected computer game for downloading.

19 Claims, 4 Drawing Sheets

(56) References Cited

U.S. PATENT DOCUMENTS

2013/0325315 A1* 12/2013 Beaurepaire ....... G01C 21/3423
                                                                701/400
2014/0267429 A1    9/2014 Justice
2016/0364224 A1* 12/2016 Tuukkanen ............... G06F 8/61

FOREIGN PATENT DOCUMENTS

| CN | 109513213 A  | 3/2019  |
|----|--------------|---------|
| WO | 2012146985 A2 | 11/2012 |
| WO | 2016198945 A1 | 12/2016 |

* cited by examiner

COMPUTER GAME SOFTWARE DOWNLOADING

RELATED APPLICATION DATA

This application is a continuation of International Patent Application No. PCT/CN2020/086476, filed Apr. 23, 2020, which claims the benefit of European Patent Application No. 19173189.2, filed May 7, 2019, the disclosures of which are incorporated herein by reference in their entireties.

TECHNICAL FIELD

The present disclosure relates generally to the field of computer software handling. More particularly, it relates to downloading of computer software for provision of a computer game.

BACKGROUND

It is common that computer software for provision of a computer gaming service (provision of a computer game) is not stored long term on a gaming device configure to provide the gaming service. Instead, the computer software for provision of the computer gaming service may be available for downloading from one or more remote storing devices.

Advantages of such an approach includes relaxed requirements regarding the storing capacity of the gaming device as well as increased probability that a latest version of the computer software is used when the gaming service is provided (e.g., when the game is played).

A problem with such an approach is that it typically takes some time to download the computer software for provision of a computer gaming service, and hence that waiting time may arise before provision of the gaming service begins.

WO 2012/146985 A9 discloses an approach for remotely provisioning immediately executable applications. Immediately initially executable portions of applications are pushed onto user desktops, and when applications are selected for use, additional components of selected applications are streamed to said desktops.

Using such an approach in the context of computer software for provision of a computer gaming service may lead to a reduced waiting time until provision of the gaming service begins.

Another problem with the approach of having the computer software available for downloading and not having it stored long term on the gaming device is that there may be excess downloading. Some of the computer software that is downloaded and stored short term on the gaming device may never be used before it is discarded. This problem in turn leads to unnecessary use of storing space of the gaming device and/or unnecessary use of downloading resources (e.g., power consumption, channel capacity, subscription data limit, etc.).

Therefore, there is a need for alternative approaches to downloading of computer software for provision of a computer gaming service.

SUMMARY

It should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

It is an object of some embodiments to solve or mitigate, alleviate, or eliminate at least some of the above or other disadvantages.

A first variant of a first aspect is a method for a gaming device of a vehicle, wherein the gaming device is configured to provide computer games, and wherein computer software for the computer games is available for downloading from one or more remote storing devices.

The method comprises acquiring time information of a journey, acquiring an indication of a selected computer game for the journey, and determining—based on the time information of the journey—a remaining time period to a specific point in time associated with the journey.

The method also comprises determining—based on the remaining time period to the specific point in time associated with the journey—an extent of the computer software for the selected computer game for downloading.

An advantage of the first aspect is that the extent of the computer software that is downloaded for the selected game can be adjusted to the time information of the journey. Thus, excess downloading may be avoided; at least to some extent.

In some embodiments, the specific point in time is associated with a destination of the vehicle for the journey.

An advantage of these embodiments is that the extent of the computer software that is downloaded for the selected game can be adjusted to the expected time of arrival at the destination of the journey. For example, the extent of the computer software that is downloaded for the selected game may be limited to computer software necessary for the portion of the computer game expected to be played before arrival at the destination of the journey.

In some embodiments, the determined extent of the computer software is defined by one or more of: a resolution for rendering of the selected computer game, one more service sections of the selected computer game, and a functionality of the selected computer game.

An advantage of these embodiments is that extent of the computer software that is downloaded for the selected game can be flexibly adjusted. For example, in a capacity limited downloading scenario, the extent may be determined as a trade-off between the number of service sections to be downloaded and the resolution and/or functionality associated with the downloaded service sections.

In some embodiments, the journey is an ongoing journey and each computer game comprises two or more service sections.

In some of these embodiments, determining the extent of the computer software for the selected computer game for downloading comprises predicting—during provisioning of a current service section of the selected computer game—whether provisioning of all service sections that can be provided by already downloaded computer software using high-resolution rendering will be finalized before the ongoing journey of the vehicle is completed, and—if so (i.e., when it is predicted that provisioning of all service sections that can be provided by already downloaded computer software using high-resolution rendering will be finalized before the ongoing journey of the vehicle is completed)—determining the extent of the computer software for the selected computer game for downloading as computer software required for provisioning of a further service section of the selected computer game.

In some of these embodiments, the method further comprises downloading the computer software required for provisioning of the further service section of the selected computer game.

In some of these embodiments, the method further comprises—when it is predicted that provisioning of all service sections that can be provided by already downloaded computer software using high-resolution rendering will not be finalized before the ongoing journey of the vehicle is completed—pausing or stopping downloading of computer software required for provisioning of the selected computer game.

An advantage of these embodiments is that the extent of the computer software that is downloaded for the selected game can be adjusted such that downloading only continues as long as it is likely that already downloaded computer software will not be enough to keep the game running during the entire ongoing journey.

In some embodiments, predicting whether provisioning of all service sections that can be provided by already downloaded computer software using high-resolution rendering will be finalized before the ongoing journey of the vehicle is completed is based on the determined remaining time period to a specific point in time associated with the journey, wherein the specific point in time is an estimate of a time of arrival for the ongoing journey acquired from a navigation system of the vehicle.

An advantage of these embodiments is that the extent of the computer software that is downloaded for the selected game can be coordinated with navigation system information. Thereby, improved (e.g., increased) accuracy, validity and/or relevance of the extent determination is provided.

In some embodiments, predicting whether provisioning of all service sections that can be provided by already downloaded computer software using high-resolution rendering will be finalized before the ongoing journey of the vehicle is completed is based on a gaming progress within the current service section and/or within one or more previous service sections.

An advantage of these embodiments is that the extent of the computer software that is downloaded for the selected game can be coordinated with a current and/or previous progress of the gamer. Thereby, improved (e.g., increased) accuracy, validity and/or relevance of the extent determination is provided. For example, if a gamer has been stuck on a level (an example of a service section) for a duration of time that exceeds a threshold value, it may be determined that it is sufficient to download the next level (at least until the gamer completes the current level). Alternatively or additionally, if a gamer has a history of been stuck on a particular level for a duration of time that exceeds a threshold value, it may be determined that it is sufficient to download the next level (at least until the gamer completes the current level). Yet alternatively or additionally, if a gamer has—on one or more levels before the current one—been spending a duration of time that exceeds a threshold value, it may be determined that it is sufficient to download the next level (at least until the gamer completes the current level).

In some embodiments, determining the extent of the computer software for the selected computer game for downloading further comprises predicting whether provisioning of the current service section will be finalized before downloading of computer software required for provisioning of a subsequent service section using high-resolution rendering can be completed.

In some of these embodiments, downloading computer software required for provisioning of the further service section comprises—when it is predicted that provisioning of the current service section will be finalized before downloading of computer software required for provisioning of the subsequent service section using high-resolution rendering can be completed—downloading the computer software required for provisioning of the subsequent service section using low-resolution rendering.

In some of these embodiments, downloading computer software required for provisioning of the further service section further comprises—when it is predicted that provisioning of the current service section will not be finalized before downloading of computer software required for provisioning of the subsequent service section using high-resolution rendering can be completed—downloading the computer software required for provisioning of the further service section using high-resolution rendering.

An advantage of these embodiments is that the risk is reduced of there being a waiting period before the subsequent service section can be provisioned when the current service section is finalized, while enabling provisioning of the subsequent service section using high-resolution rendering whenever possible.

In some embodiments, predicting whether provisioning of the current service section will be finalized before downloading of computer software required for provisioning of the subsequent service section using high-resolution rendering can be completed is based one or more of a downloading speed, route information for the ongoing journey provided by a navigation system of the vehicle, and a gaming progress within the current service section and/or within one or more previous service sections.

An advantage of these embodiments is that the extent of the computer software that is downloaded for the selected game can be coordinated with one or more of downloading speed, navigation system information, and gaming progress. Thereby, improved (e.g., increased) accuracy, validity and/or relevance of the extent determination is provided.

In some embodiments, determining the extent of the computer software for the selected computer game for downloading further comprises—during provisioning of the current service section using low resolution rendering—predicting whether provisioning of the current service section will be finalized before downloading of computer software required for provisioning of the current service section using high-resolution rendering can be completed.

In some of these embodiments, downloading computer software required for provisioning of the further service section comprises—when it is predicted that provisioning of the current service section will be finalized before downloading of computer software required for provisioning of the current service section using high-resolution rendering can be completed—downloading computer software required for provisioning of the further service section using low-resolution rendering.

In some of these embodiments, downloading computer software required for provisioning of the further service section further comprises—when it is predicted that provisioning of the current service section will not be finalized before downloading of computer software required for provisioning of the current service section using high-resolution rendering can be completed—downloading computer software required for provisioning of the current service section using high-resolution rendering.

An advantage of these embodiments is that the extent of the computer software that is downloaded for the selected game can be adjusted to the current situation; in a trade-off between resolution and waiting time. For example, if the current level is rendered in low resolution and will be finalized before computer software for rendering it in high resolution can be downloaded, there is no use in commencing downloading the computer software for rendering it in high resolution. Instead, computer software required for provisioning of one or more further levels may be downloaded.

In some embodiments, the method further comprises downloading computer software required for provisioning of an initial service section of the selected computer game using low resolution rendering, and initiating provisioning of the initial service section.

An advantage of these embodiments is that the selected computer game may be initiated with minimum delay.

In some embodiments, the method further comprises—after initiating provisioning of the initial service section—downloading computer software required for provisioning of the initial service section using high-resolution rendering.

An advantage of these embodiments is that rendering of the selected computer game may be performed using high resolution as soon as possible after initiation.

In some embodiments, the time information comprises one or more of: a total duration of the journey, a remaining duration of the journey, a starting time of the journey, an ending time of the journey, an estimated total duration of the journey, an estimated remaining duration of the journey, an estimated starting time of the journey, and an estimated ending time of the journey.

In some embodiments, the specific point in time is an estimate of a time of arrival for the ongoing journey.

In some embodiments, the time information and/or the specific point in time is acquired from a navigation system of the vehicle.

A second variant of a first aspect is a method for a gaming device of a vehicle, wherein the gaming device is configured to provide computer gaming services (e.g., computer games), wherein computer software for the computer gaming services is available for downloading from one or more remote storing devices, and wherein each computer gaming service comprises two or more service sections.

The method comprises predicting—during provisioning of a current service section of a computer gaming service—whether provisioning of all service sections that can be provided by already downloaded computer software using high-resolution rendering will be finalized before the ongoing journey of the vehicle is completed, and—if so (i.e., when it is predicted that provisioning of all service sections that can be provided by already downloaded computer software using high-resolution rendering will be finalized before the ongoing journey of the vehicle is completed)—downloading computer software required for provisioning of a further service section of the computer gaming service.

In some embodiments, features and/or advantages of any of the embodiments described herein for the first variant of the first aspect may be equally applicable for the second variant of the first aspect.

A second aspect is a computer program comprising program instructions. The computer program is loadable into a data processing unit and configured to cause execution of the method according to the first aspect when the computer program is run by the data processing unit.

A third aspect is a computer program product comprising a computer readable medium carrying a computer program comprising program instructions. The computer program is loadable into a data processing unit and configured to cause execution of the method according to the first aspect when the computer program is run by the data processing unit.

A fourth aspect is a control unit for a gaming device. The control unit is configured to cause execution of the method according to the first aspect.

A first variant of a fifth aspect is an apparatus for a gaming device of a vehicle. The gaming device is configured to provide computer games, and computer software for the computer games is available for downloading from one or more remote storing devices.

The apparatus comprises controlling circuitry configured to cause acquisition of time information of a journey, acquisition of an indication of a selected computer game for the journey, determination—based on the time information of the journey—of a remaining time period to a specific point in time associated with the journey, and determination—based on the remaining time period to the specific point in time associated with the journey—of an extent of the computer software for the selected computer game for downloading.

A second variant of a fifth aspect is an apparatus for a gaming device of a vehicle, wherein the gaming device is configured to provide computer gaming services (e.g., computer games), wherein computer software for the computer gaming services is available for downloading from one or more remote storing devices, and wherein each computer gaming service comprises two or more service sections.

The apparatus comprises controlling circuitry configured to cause prediction—during provisioning of a current service section of a computer gaming service—of whether provisioning of all service sections that can be provided by already downloaded computer software using high-resolution rendering will be finalized before the ongoing journey of the vehicle is completed, and—if so (i.e., responsive to prediction that provisioning of all service sections that can be provided by already downloaded computer software using high-resolution rendering will be finalized before the ongoing journey of the vehicle is completed)—downloading of computer software required for provisioning of a further service section of the computer gaming service.

In some embodiments, features and/or advantages of any of the embodiments described herein for the first variant of the fifth aspect may be equally applicable for the second variant of the fifth aspect.

A sixth aspect is a gaming device for a vehicle, wherein the gaming device comprises one or more of the control unit of the fourth aspect, and the apparatus of the fifth aspect.

A seventh aspect is a vehicle comprising one or more of the gaming device of the sixth aspect, the control unit of the fourth aspect, and the apparatus of the fifth aspect.

An eighth aspect is a gaming system comprising the one or more remote storing devices and one or more of the gaming device of the sixth aspect, the control unit of the fourth aspect, and the apparatus of the fifth aspect.

Generally, various embodiments entail a reduction of excess downloading while providing good user experience (e.g., avoiding service gaps, using high-resolution rendering when possible, etc.).

In some embodiments, any of the above aspects may additionally have features and/or advantages identical with or corresponding to any of the various features and/or advantages for any of the other aspects; as explained above or otherwise herein.

BRIEF DESCRIPTION OF THE DRAWINGS

Further objects, features and advantages will become apparent from the appended claims and the following detailed description of embodiments, with reference being made to the accompanying drawings. The drawings are not necessarily to scale, emphasis instead being placed upon illustrating the example embodiments.

DETAILED DESCRIPTION

Figure 1:
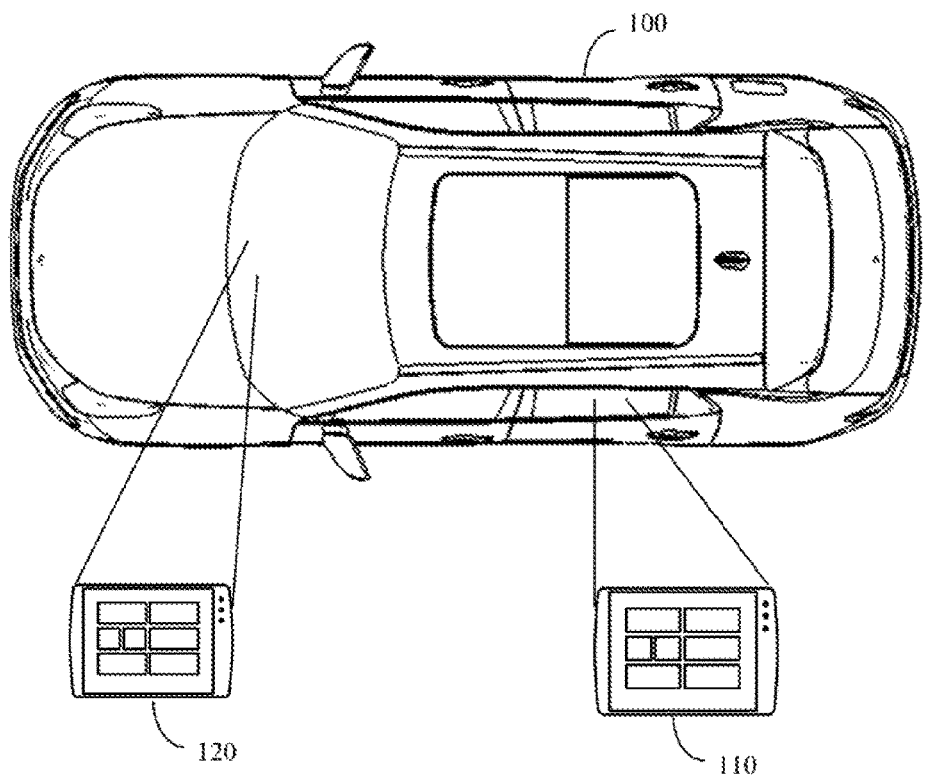
FIG. 1 is a schematic drawing illustrating an example vehicle according to some embodiments.

As already mentioned above, it should be emphasized that the term "comprises/comprising" (replaceable by "includes/including") when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

Generally, the terms "provision of a computer game" and "provision of a computer gaming service" are used interchangeably herein. Both terms are meant to encompass any service that enables a user to play a game and/or perform other actions associated with a game (e.g., updating or inspecting score tables, selecting avatars or other characteristics of a game, storing the progress of a gaming session for later use, storing personal game settings, etc.). A service section of a computer game may refer to any suitable part or function of a game (e.g., a level of the game, a task of the game, a particular avatar or item used in the game, etc.).

Also generally, rendering used when providing a game or a service section may refer to any user interface output expression (e.g., graphics, sound, haptics, etc.). The terms "high-resolution rendering" and "low-resolution rendering" may be defined in relation to each other; high-resolution rendering having a resolution that is higher than that of low-resolution rendering. Further, high-resolution rendering may refer to a default resolution rendering according to some embodiments.

As already mentioned, it is common that computer software for provision of a computer gaming service is not stored long term on a gaming device configure to provide the gaming service. Instead, the computer software for provision of the computer gaming service may be available for downloading from one or more remote storing devices.

Advantages of such an approach includes relaxed requirements regarding the storing capacity of the gaming device as well as increased probability that a latest version of the computer software is used when the gaming service is provided (e.g., when the game is played).

A problem with the approach is that it typically takes some time to download the computer software for provision of a computer gaming service, and hence that waiting time may arise before provision of the gaming service begins, which results in poor user experience.

Some embodiments presented herein may be particularly relevant for games for which large amounts of computer software (inherently taking relatively long time to download in entirety) is needed for provision of the game.

Some embodiments may be particularly relevant in the context of a gaming device used in a vehicle during a journey of the vehicle. For example, if the gaming device is associated with a shared vehicle (e.g., of a car pool, a car fleet) it may not be preferable to await a complete download of the computer software needed for provision of a game.

Another problem with the approach is that there may be excess downloading. Some of the computer software that is downloaded and stored short term (e.g., during a gaming session, during provision of a service section, during a journey, etc.) on the gaming device may never be used before it is discarded (e.g., when the gaming session is over, when the service section is completed, when the journey is over, etc.). On the other hand, if downloading of some parts of the computer software is put off until it is needed for rendering, there is a risk that stalling occurs during the provision of the gaming service, which results in poor user experience.

In the following, embodiments will be described where alternative approaches are provided for downloading of computer software for provision of a computer gaming service.

FIG. 1 schematically illustrates an example vehicle 100 according to some embodiments. The example vehicle 100 is associated with (e.g., comprises, is connected to, is connectable to) a gaming device 110 and a navigation system (e.g., a navigation device) 120. In some embodiments, the gaming device and the navigation system are embodied as separate apparatuses as illustrated in FIG. 1. In some embodiments, the gaming device and the navigation system may be comprised in a single apparatus. In some embodiments, the gaming device and/or the navigation system may each be distributed over two or more apparatuses (e.g., several gaming consoles).

Figure 2:
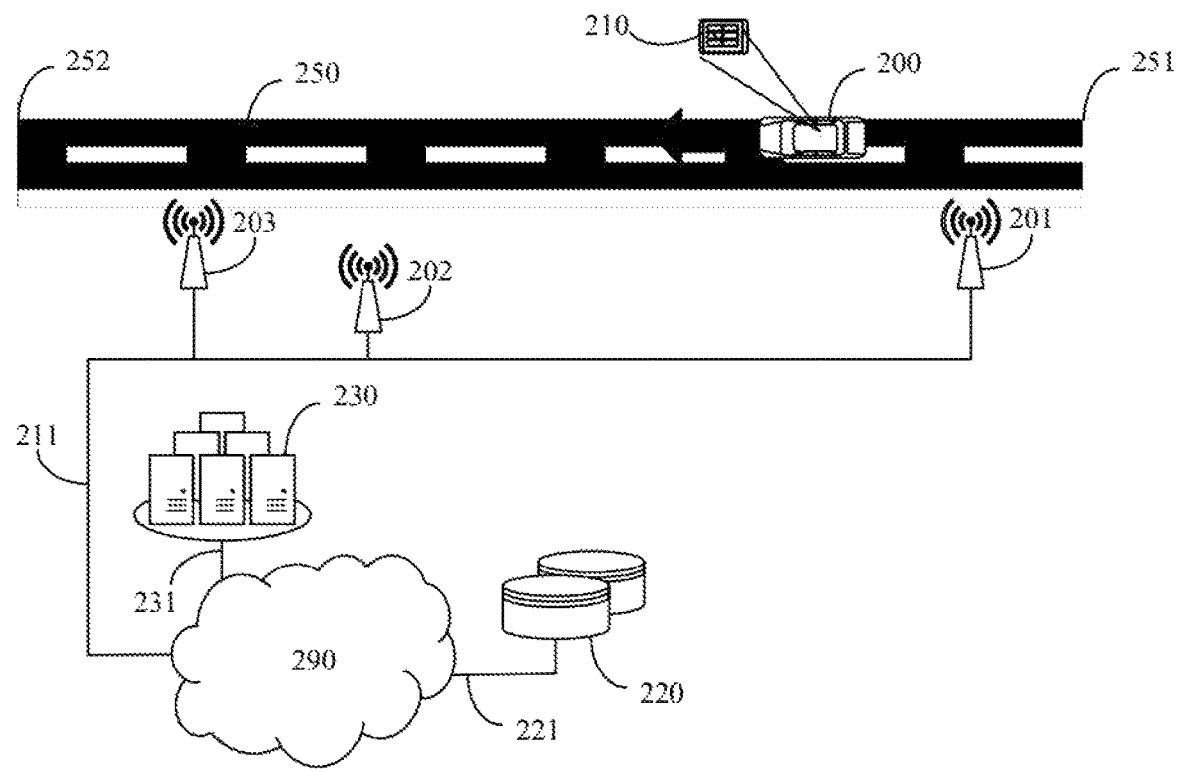
FIG. 2 is a schematic drawing illustrating an example gaming system according to some embodiments.

FIG. 2 schematically illustrates an example gaming system according to some embodiments. The example gaming system comprises a gaming device 210 (e.g., the gaming device 110 of FIG. 1) associated with a vehicle 200 (e.g., the vehicle 100 of FIG. 1) and one or more remote storing devices 220. The gaming device 210 is configured to provide computer games, and computer software for the computer games is available for downloading from the one or more remote storing devices 220.

For example, downloading of an extent of the computer software may be performed before and/or during a journey of the vehicle. The journey is schematically illustrated as a route 250 having a beginning (starting point) 251 and an end (destination) 252. The downloading may be achieved via one or more wireless access points 201, 202, 203 (e.g., base stations of a cellular communication system), each serving part of the route.

The one or more wireless access points 201, 202, 203 may be operatively connected (e.g., via one or more wired or wireless connections 211) to a network 290 (e.g., the Internet or another network service or cloud-based service). The one or more remote storing devices 220 are also operatively connected to the network 290 (e.g., via one or more wired or wireless connections 221). There may also be one or more monitoring servers 230 operatively connected to the network 290 (e.g., via one or more wired or wireless connections 231).

Figure 3A:
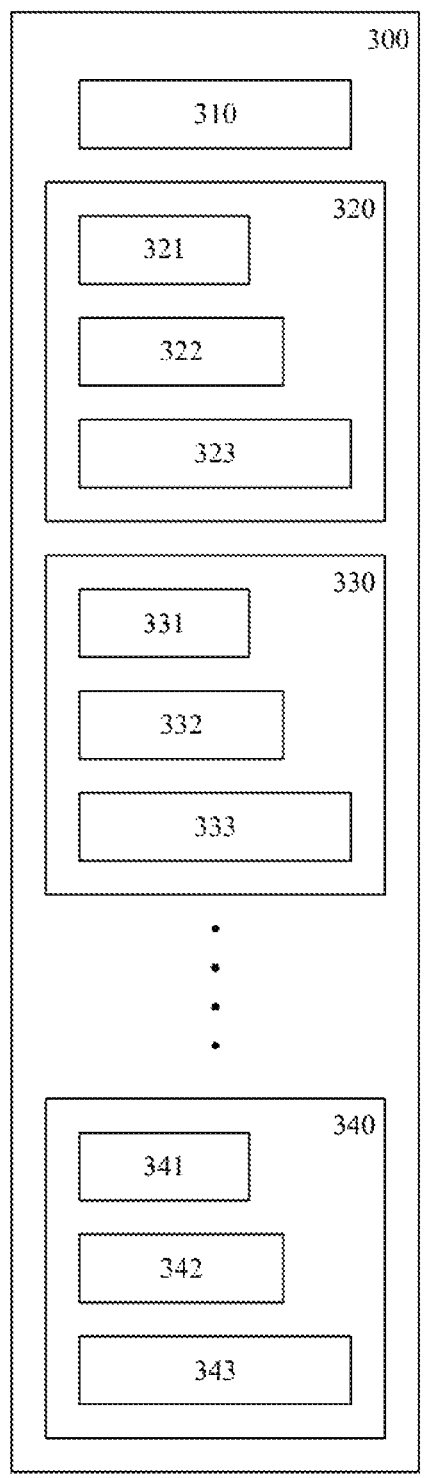
FIG. 3A is a schematic block diagram illustrating example computer software for a computer game according to some embodiments.

FIG. 3A schematically illustrates example computer software 300 for a computer game according to some embodiments. The example computer software 300 comprises several computer software parts 310, 320, 330, 340. The computer software part 320 comprises sub-parts 321, 322, 323, the computer software part 330 comprises sub-parts 331, 332, 333, and the computer software part 340 comprises sub-parts 341, 342, 343.

For example, the computer software part 310 may be computer software for a game engine and each of the computer software parts 320, 330, 340 may be computer software for a level of the game; wherein the sub-parts 321, 331, 341 represent level content, the sub-parts 322, 332, 342 represent assets (e.g., graphics, sound, haptics, etc.) for low-resolution rendering of the level, and the sub-parts 323, 333, 343 represent assets (e.g., graphics, sound, haptics, etc.) for high-resolution rendering of the level.

Figure 3B:
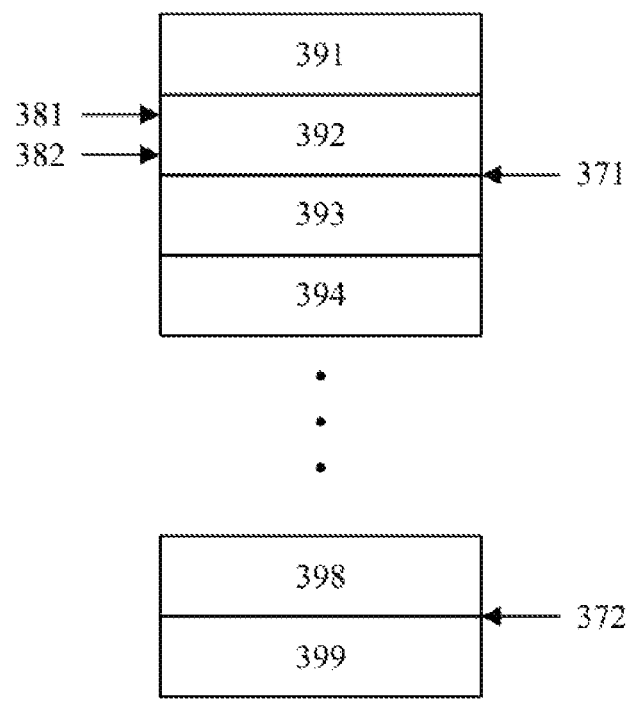
FIG. 3B is a schematic drawing illustrating example downloading progress of computer software for a computer game, and example playing progress of the computer game, according to some embodiments.

FIG. 3B schematically illustrates example downloading progress of computer software for a computer game, as well as example playing (or gaming) progress of the computer game, according to some embodiments.

The computer software for the game comprises different software parts 391, 392, 393, 394, . . . , 398, 399 (compare with the software parts 320, 330, 340 of FIG. 3A), which may each correspond to a service section (e.g., a level) of the game.

The markers 371 and 372 represent two different downloading progressions. Marker 371 represents a situation where the software parts 391 and 392 have been downloaded but software parts 393, 394, . . . , 398, and 399 have not yet been downloaded. Marker 372 represents a situation where the software parts 391, 392, 393, 394, . . . , and 398, have been downloaded but software part 399 has not yet been downloaded.

The markers 381 and 382 schematically represent two different playing progressions. Marker 381 represents a situation where the player (user) has not progressed far within the service section (e.g., level) provisioned by software part 392, while marker 382 represents a situation where the player has progressed farther within the service section provisioned by software part 392. For example, marker 381 may represent a situation where the player has recently entered the service section provisioned by software part 392, while marker 382 may represent a situation where the player has almost completed the service section provisioned by software part 392.

Figure 4:
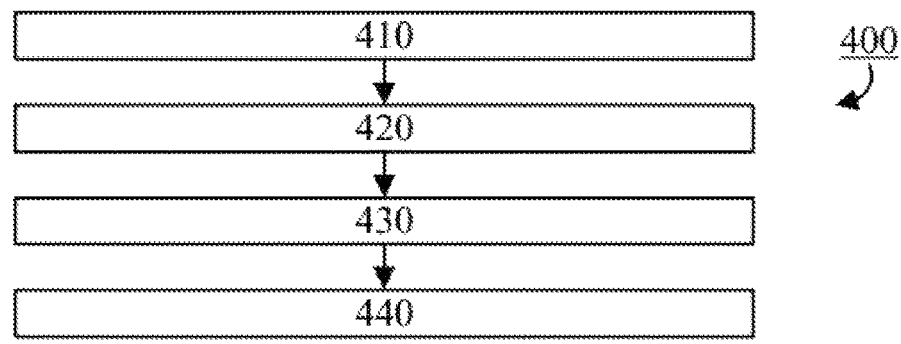
FIG. 4 is a flowchart illustrating example method steps according to some embodiments.

FIG. 4 illustrates an example method 400 according to some embodiments. The example method 400 may, for example, be performed by any of the gaming devices 110 of FIG. 1 and 210 of FIG. 2, or by controlling circuitry associated with (e.g., operatively connectable—or connected—to) the any of the gaming devices 110 and 210.

In any case, the example method 400 is for a gaming device of a vehicle, wherein the gaming device is configured to provide computer games, and wherein computer software (e.g., the computer software 300 of FIG. 3A) for the computer games is available for downloading from one or more remote storing devices (e.g., the remote storing devices 220 of FIG. 2).

In step 410, time information of a journey is acquired. The journey may be an ongoing journey or a future journey. The time information may, for example, comprise one or more of a total duration of the journey, a remaining duration of the journey, a starting time of the journey, an ending time of the journey, etc. The time information may comprise actual time information (e.g., a starting time of an ongoing journey) and/or estimated time information (e.g., a planned starting time of a future journey, an estimated remaining duration of an ongoing journey, etc.). In typical scenarios, the time information may be acquired (received) from a navigation system of the vehicle (e.g., the navigation system 120 of FIG. 1).

In step 420, an indication of a selected computer game for the journey is acquired. Acquiring the indication of the selected computer game may, for example, comprise detecting—via a user interface of the gaming device—a user input indicative of the selection of the computer game, or receiving—from a communication device (e.g., a smartphone or tablet)—a signal indicative of the selection of the computer game. For example, a user may select the computer game for a future journey via a communication device before gaining physical access to the vehicle.

It should be noted that steps 410 and 420 may be performed in the order illustrated in FIG. 1, in an order opposite to that illustrated in FIG. 1, or partly or fully in parallel.

In step 430, a remaining time period to a specific point in time associated with the journey is determined—based on the time information of the journey. For an ongoing journey, the specific point in time associated with the journey may, for example, be an estimated time of arrival at a destination of the journey. For a future journey, the specific point in time associated with the journey may, for example, be a planned starting time of the journey and/or an estimated time of arrival at a destination of the journey.

It should be noted that although step 430 is typically performed after step 410, it may be performed before, after, or partly or fully in parallel to step 420.

In step 440, it is determined—based on the remaining time period to the specific point in time associated with the journey—an extent of the computer software for the selected computer game for downloading.

The determined extent of the computer software may, for example, be defined by one or more of a resolution for rendering of the selected computer game, one more service sections of the selected computer game, and a functionality of the selected computer game. For example, the determined extent of the computer software may comprise the sub-parts 331 and 333 of software part 330 of FIG. 3A (if the software part 330 represents a second level of the game; defining the extent as software for providing the second level content using high-resolution rendering).

In some embodiments, the example method may further comprise downloading the determined extent of the computer software.

Figure 5:
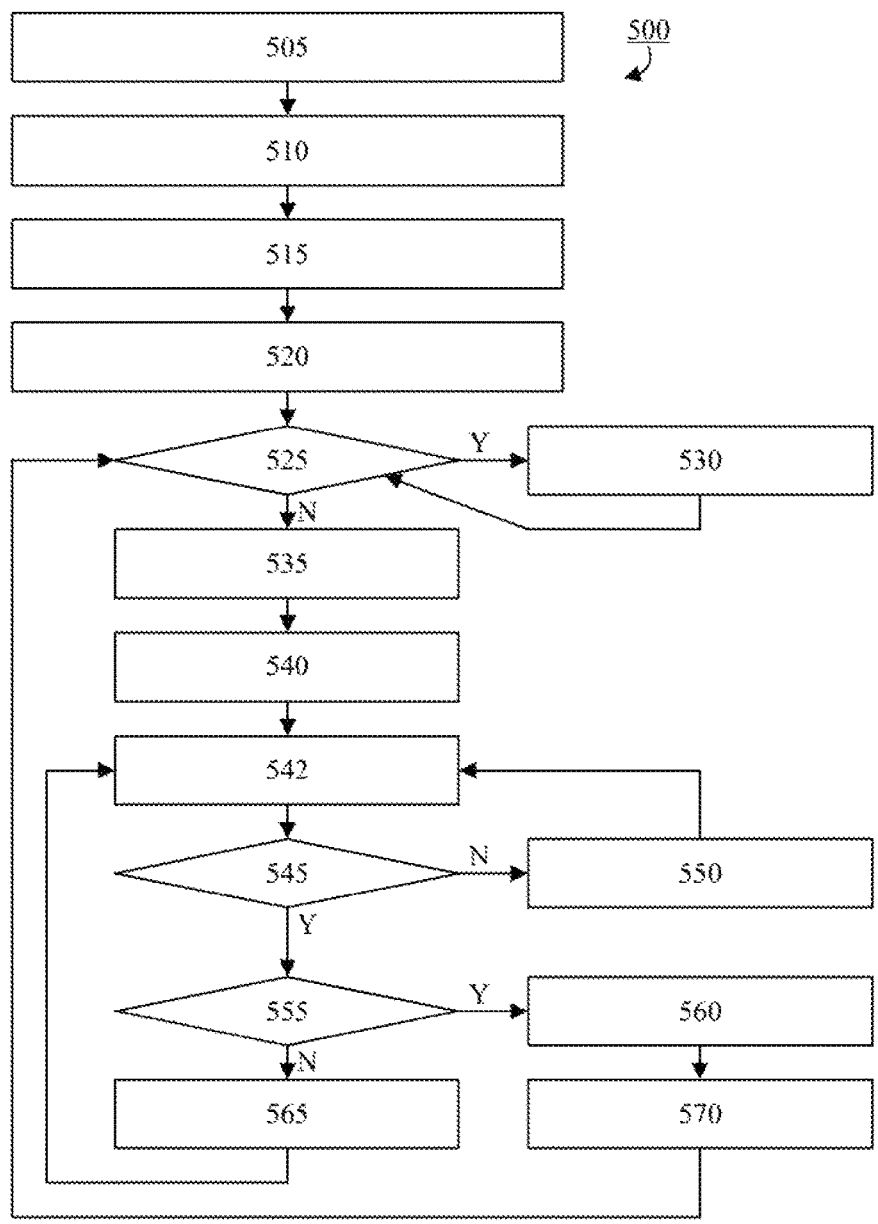
FIG. 5 is a flowchart illustrating example method steps according to some embodiments.

FIG. 5 illustrates an example method 500 according to some embodiments. The example method 500 may, for example, be performed by any of the gaming devices 110 of FIG. 1 and 210 of FIG. 2, or by controlling circuitry associated with (e.g., operatively connectable—or connected—to) the any of the gaming devices 110 and 210. The method 500 may be seen as an example of the method 400 of FIG. 4 and is particularly suitable for an ongoing journey.

In any case, the example method 500 is for a gaming device of a vehicle, wherein the gaming device is configured to provide computer games, and wherein computer software (e.g., the computer software 300 of FIG. 3A) for the computer games is available for downloading from one or more remote storing devices (e.g., the remote storing devices 220 of FIG. 2).

In step 505 (compare with step 420 of FIG. 4), an indication of a selected computer game for the journey is acquired, for example, by detecting—via a user interface of the gaming device—a user input indicative of the selection of the computer game.

In steps 510 and 515, computer software required for provisioning of an initial service section of the selected computer game using low resolution rendering is downloaded. For example, step 510 may comprise downloading of a game engine (compare with part 310 of FIG. 3A) and possibly personal game settings and step 515 may comprise downloading of content and assets for low-resolution rendering of a first level of the game (compare with sub-parts 321 and 322 of FIG. 3A).

Steps 510 and 515 may be realized as two separate steps as illustrated in FIG. 5, or as a single step.

Then, provisioning of the initial service section is initiated in step 520. For example, the first level of the game may be initiated using low-resolution rendering.

In step 525 it is predicted, during provisioning of the current service section using low resolution rendering, whether provisioning of the current service section will be finalized before downloading of computer software required for provisioning of the current service section using high-resolution rendering can be completed.

When it is predicted that provisioning of the current service section will be finalized before downloading of computer software required for provisioning of the current service section using high-resolution rendering can be completed (Y-path out of Step 525), there is probably no use in downloading computer software required for provisioning of the current service section using high-resolution rendering (compare with sub-part 323 of FIG. 3A) since the current service section will be finalized by the time it can be provided using high-resolution rendering. Therefore, computer software required for provisioning of a further service section is downloaded instead in step 530. Thereby, the probability of stalling the game when the current service section is finalized is lowered (and excess downloading for high-resolution rendering of the current service section is avoided). By letting step 530 comprise computer software required for provisioning of a further service section using low-resolution rendering, the probability of stalling the game when the current service section is finalized is lowered even further.

Generally, the further service section may be a next needed service section, the computer software of which has not yet downloaded. Thus, the further service section may be directly subsequent to the currently provisioned service section, or the further service section may be a service section needed further in the future. FIG. 3B illustrates this, wherein the computer software part 392 corresponds to the current service section and the computer software part 393 corresponds to the subsequent service section. If the downloading progress is as represented by marker 371, the further service section coincides with the subsequent service section; both corresponding to computer software part 393. If the downloading progress is as represented by marker 372, the further service section corresponds to computer software part 399.

When it is predicted that provisioning of the current service section will not be finalized before downloading of computer software required for provisioning of the current service section using high-resolution rendering can be completed (N-path out of Step 525), computer software required for provisioning of the current service section using high-resolution rendering is downloaded in step 535.

When the computer software required for provisioning of the current service section using high-resolution rendering has been downloaded, the provision of the game is switched from low-resolution rendering to high-resolution rendering in step 540.

In step 542, time information of the journey is acquired and a remaining time period to a specific point in time associated with the journey is determined based on the time information of the journey (compare with steps 410 and 430 of FIG. 4). In a typical scenario, the time information is acquired from a navigation system (e.g., the navigation system 120 of FIG. 1) of the vehicle and the specific point in time associated with the journey is an estimated time of arrival at a destination of the journey. Then, step 542 may simply comprise receiving an estimated remaining duration of the journey from the navigation system.

In step 545 (compare with step 440 of FIG. 4), it is predicted whether provisioning of all service sections that can be provided by already downloaded computer software using high-resolution rendering will be finalized before the ongoing journey of the vehicle is completed. This may be achieved by comparing the estimated remaining duration of the journey to an estimated time to finalize the current and all other downloaded—but not yet finalized—service sections.

When it is predicted that provisioning of all service sections that can be provided by already downloaded computer software using high-resolution rendering will not be finalized before the ongoing journey of the vehicle is completed (N-path out of Step 545), there is probably no use in downloading more computer software since the already downloaded service sections will not be finalized during the estimated remaining duration of the journey. Therefore, downloading of computer software required for provisioning of the selected computer game is paused or stopped instead in step 550. Thereby, excess downloading is avoided.

If downloading is paused in step 550, steps 542 and 545 may be repeated iteratively and downloading may be re-commenced if it is predicted that provisioning of all service sections that can be provided by already downloaded computer software using high-resolution rendering will be finalized before the ongoing journey of the vehicle is completed. This may occur, for example, if the estimated remaining duration of the journey is decreased and/or if the game progresses fasted than expected.

When it is predicted that provisioning of all service sections that can be provided by already downloaded computer software using high-resolution rendering will be finalized before the ongoing journey of the vehicle is completed (Y-path out of Step 545), it is determined to download computer software required for provisioning of a further service section of the selected computer game.

The further service section can be downloaded for high-resolution rendering or low-resolution rendering. In step 555, it is predicted whether provisioning of the current service section will be finalized before downloading of computer software required for provisioning of a subsequent service section using high-resolution rendering can be completed.

When it is predicted that provisioning of the current service section will be finalized before downloading of computer software required for provisioning of a subsequent service section using high-resolution rendering can be completed (Y-path out of step 555), the computer software required for provisioning of the subsequent service section is downloaded for low-resolution rendering instead in step 560. Thereby, the probability of stalling the game when the current service section is finalized is lowered. Then, downloading of the computer software required for provisioning of the subsequent service section for high-resolution rendering may be started (also in step 560, possibly continued in step 535). If the current service section is indeed finalized before downloading of computer software required for provisioning of the subsequent service section using high-resolution rendering is completed, the provision of the game is switched to low-resolution rendering in step 570, and the method returns to step 525.

When it is predicted that provisioning of the current service section will not be finalized before downloading of computer software required for provisioning of a subsequent service section using high-resolution rendering can be completed (N-path out of step 555), computer software required for provisioning of the further service section using high-resolution rendering is downloaded in step 565, and the method returns to step 542. This may happen if the computer software required for provisioning of the subsequent service section using high-resolution rendering is already downloaded (compare, for example, with downloading progress of marker 372 of FIG. 3B), or if the computer software required for provisioning of the subsequent service section using high-resolution rendering is not downloaded (compare, for example, with downloading progress of marker 371 of FIG. 3B) but will probably be so by the time the current service section is finalized.

It should be noted that in various embodiments one or more of the steps of the method 500 may be omitted or considered optional. To exemplify, steps 515 and 520 may be omitted when the current download speed is above a threshold value and/or when computer software for provision of the first service section of the game is not very extensive (e.g., has a size which is less than a threshold value). Alternatively or additionally, steps 525, 530 and/or steps 555, 560, 570 may be omitted (e.g., so that the game is always provided using high-resolution rendering once high-resolution rendering has started).

Generally, the predictions of steps 525, 545 and 555 may be performed based on one or more of:

Route information for the ongoing journey provided by a navigation system. The information may comprise the time information referred to earlier and/or spatial information of the route.

A gaming progress within the current service section and/or within one or more previous service sections (using the current gaming session and/or a previous gaming session), wherein gaming progress may be defined via how much time is spent in total on a service section and/or a progression speed within a service section.

A downloading speed, which may differ at different times during a journey. For example, the downloading speed may be statistically monitored (e.g., by the one or more monitoring servers 230 of FIG. 2) such that a prediction of upcoming downloading speeds may be achieved for the planned route of the journey.

For example, predicting (step 525) whether provisioning of the current service section will be finalized before downloading of computer software required for provisioning of the current service section using high-resolution rendering can be completed and/or predicting (step 555) whether provisioning of the current service section will be finalized before downloading of computer software required for provisioning of a subsequent service section using high-resolution rendering can be completed may typically comprise comparing a predicted downloading time for the computer software (which is predicted using the downloading speed and the size of the relevant computer software) with an estimated time until the current service section is finalized (which is estimated based on the gaming progress). For example, it may be determined that provisioning of the current service section will be finalized before downloading of the respective computer software can be completed when the predicted downloading time for the computer software is longer than the estimated time until the current service section is finalized.

For example, predicting (step 545) whether provisioning of all service sections that can be provided by already downloaded computer software using high-resolution rendering will be finalized before the ongoing journey of the vehicle is completed may typically comprise comparing an estimated time until all downloaded service sections are finalized (which is estimated based on the gaming progress) with an estimated remaining time of the journey (which is estimated based on the route information). For example, it may be determined that provisioning of all service sections that can be provided by already downloaded computer software using high-resolution rendering will be finalized before the ongoing journey of the vehicle is completed when the estimated time until all downloaded service sections are finalized is shorter than the estimated remaining time of the journey.

Generally, an estimated time until the current service section is finalized may be determined as an average time spent on the current service section during previous gaming sessions minus time already spent on the current service section during the current gaming session, or as an average time spent on the current service section during previous gaming sessions multiplied by a ratio of the time already spent on the current service section during the current gaming session to the average time spent on the current service section during previous gaming sessions to reach the current progress.

Also generally, an estimated time until all downloaded service sections are finalized may be determined as the estimated time until the current service section is finalized plus an average time spent on other downloaded service sections during previous gaming sessions.

Furthermore, the predicted downloading speed can be used to determine whether or not to prioritize high-resolution rendering (e.g., when the downloading speed is low, there may be a bias towards low-resolution rendering to avoid stalling the game). For example, steps 525, 530 and/or steps 555, 560, 570 may be omitted when the downloading speed is high, while they may be used when the downloading speed is low.

Figure 6:
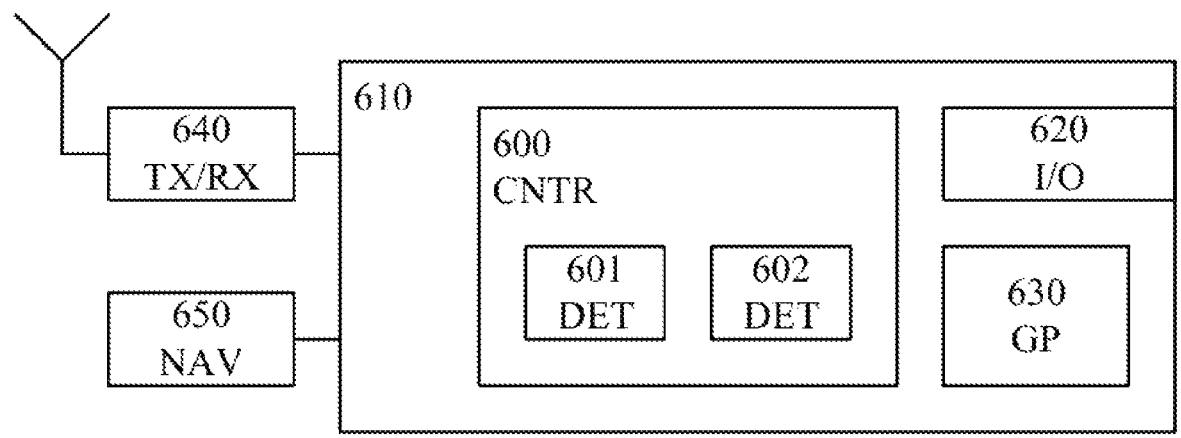
FIG. 6 is a schematic block diagram illustrating an example apparatus according to some embodiments.

FIG. 6 schematically illustrates an example apparatus 610 according to some embodiments. The example apparatus 601 may, for example, be (or be comprised in) any of the gaming devices 110 of FIG. 1 and 210 of FIG. 2. Alternatively or additionally, the example apparatus 601 may, for example, be configured to perform (or cause performance of) steps of one or more of the method 400 of FIG. 4 and the method 500 of FIG. 5.

In any case, the example apparatus is for a gaming device of a vehicle, wherein the gaming device is configured to provide computer games, and wherein computer software (e.g., the computer software 300 of FIG. 3A) for the computer games is available for downloading from one or more remote storing devices (e.g., the remote storing devices 220 of FIG. 2).

For provision of a computer game, the example apparatus 610 may comprise or be otherwise associated with (e.g., operatively connected, or connectable, to) a game provisioner (GP; e.g., game provisioning circuitry) 630 configured to provision the computer game.

For downloading of computer software, the example apparatus 610 may comprise or be otherwise associated with (e.g., operatively connected, or connectable, to) a receiver (illustrated as part of a transceiver TX/RX; e.g., transceiving circuitry) 640 configured to receive computer software downloads.

The example apparatus 610 comprises a controller (CNTR; e.g., a control unit or controlling circuitry) 600.

The controller is configured to cause acquisition of time information of a journey (compare with step 410 of FIG. 4 and step 542 of FIG. 5). To this end, the controller 600 may comprise or be otherwise associated with (e.g., operatively connected, or connectable, to) a navigation system (NAV; e.g., navigation circuitry) 650 configured to provide the time information as exemplified above in connection with FIGS. 4 and 5.

The controller is also configured to cause acquisition of an indication of a selected computer game for the journey (compare with step 420 of FIG. 4 and step 505 of FIG. 5). To this end, the controller 600 may comprise or be otherwise associated with (e.g., operatively connected, or connectable, to) a user interface (I/O; e.g., interface circuitry) 620 and/or a receiver (illustrated as part of a transceiver TX/RX; e.g., transceiving circuitry) 640 configured to provide as exemplified above in connection with FIGS. 4 and 5.

The controller is also configured to cause determination, based on the time information of the journey, of a remaining time period to a specific point in time associated with the journey (compare with step 430 of FIG. 4 and step 542 of FIG. 5). To this end, the controller 600 may comprise or be otherwise associated with (e.g., operatively connected, or connectable, to) a determiner (DET; e.g., determination circuitry) 601 configured to determine the remaining time period to a specific point in time associated with the journey as exemplified above in connection with FIGS. 4 and 5.

The controller is also configured to cause determination, based on the remaining time period to the specific point in time associated with the journey, of an extent of the computer software for the selected computer game for downloading (compare with step 440 of FIG. 4 and steps 545, 555, 525 of FIG. 5). To this end, the controller 600 may comprise or be otherwise associated with (e.g., operatively connected, or connectable, to) a determiner (DET; e.g., determination circuitry) 602 configured to determine the extent of the computer software for the selected computer game for downloading as exemplified above in connection with FIGS. 4 and 5.

The determiners 601 and 602 may be embodied as separate determiners as illustrated in FIG. 6, or they may be embodied as a single determiner.

The controller may be further configured to cause downloading of the determined extent of the computer software for the selected computer game via the transceiver 640.

Generally, when an apparatus is referred to herein, it is to be understood as a physical product; e.g., a device. The physical product may comprise one or more parts, such as, for example, controlling circuitry in the form of one or more controllers, one or more processors, or the like.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a gaming device or a wireless communication device.

Embodiments may appear within an electronic apparatus (such as a gaming device or a wireless communication device) comprising arrangements, circuitry, and/or logic according to any of the embodiments described herein. Alternatively or additionally, an electronic apparatus (such as a gaming device or a wireless communication device) may be configured to perform methods according to any of the embodiments described herein.

Figure 7:
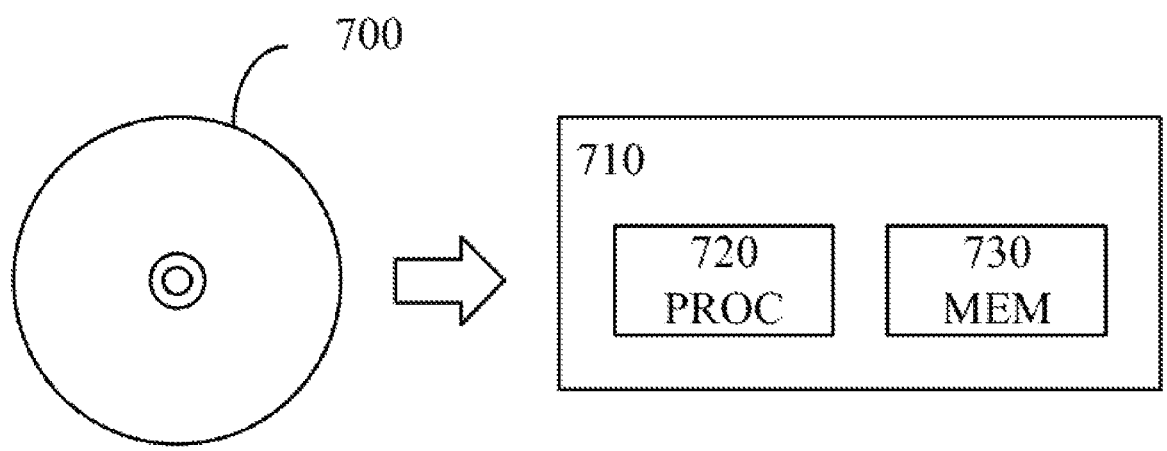
FIG. 7 is a schematic drawing illustrating an example computer readable medium according to some embodiments.

According to some embodiments, a computer program product comprises a computer readable medium such as, for example an electromagnetic signal, an optical signal, a universal serial bus (USB) memory, a plug-in card, an embedded drive or a read only memory (ROM). FIG. 7 illustrates an example computer readable medium in the form of a compact disc (CD) ROM 700. The computer readable medium carries (has stored thereon) a computer program comprising program instructions. The computer program is loadable into a data processor (PROC; e.g., data processing circuitry or a data processing unit) 720, which may, for example, be comprised in a gaming device or a wireless communication device 710. When loaded into the data processor, the computer program may be stored in a memory (MEM) 730 associated with or comprised in the data processor. According to some embodiments, the computer program may, when loaded into and run by the data processor, cause execution of method steps according to, for example, any of the methods illustrated in FIGS. 4 and 5, or otherwise described herein.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

What is claimed is:

1. A method for a gaming device of a vehicle, wherein the gaming device is configured to provide computer games, and wherein computer software for the computer games is available for downloading from one or more remote storing devices, the method carried out by a computing device and comprising:
   acquiring time information of an ongoing journey;
   acquiring an indication of a selected computer game for the ongoing journey;
   determining, based on the time information of the ongoing journey, a remaining time period to a specific point in time associated with the ongoing journey; and
   determining, based on the remaining time period to the specific point in time associated with the ongoing journey, an extent of the computer software for the selected computer game for downloading, wherein the determined extent of the computer software comprises of one or more of a game engine, a computer software part for a game level, content or assets, and the determined extent of the computer software being that which is needed by the gaming device to effectuate game play of the selected game by a user during the remaining time period, wherein each computer game comprises two or more service sections, and wherein determining the extent of the computer software for the selected computer game for downloading comprises:
     predicting, during provisioning of a current service section of the selected computer game, whether provisioning of all service sections that can be provided by already downloaded computer software using high-resolution rendering will be finalized before the ongoing journey of the vehicle is completed; and
     when it is predicted that provisioning of all service sections that can be provided by already downloaded computer software using high-resolution rendering will be finalized before the ongoing journey of the vehicle is completed, determining the extent of the computer software for the selected computer game for downloading as computer software required for provisioning of a further service section of the selected computer game; and
   downloading the computer software required for provisioning of the further service section of the selected computer game.

2. The method of claim 1, wherein the specific point in time is associated with a destination of the vehicle for the journey.

3. The method of claim 1, wherein the determined extent of the computer software is defined by one or more of: a resolution for rendering of the selected computer game, one or more service sections of the selected computer game, and a functionality of the selected computer game.

4. The method of claim 1, further comprising, when it is predicted that provisioning of all service sections that can be provided by already downloaded computer software using high-resolution rendering will not be finalized before the ongoing journey of the vehicle is completed, pausing or stopping downloading of computer software required for provisioning of the selected computer game.

5. The method of claim 1, wherein predicting whether provisioning of all service sections that can be provided by already downloaded computer software using high-resolution rendering will be finalized before the ongoing journey of the vehicle is completed is based on the determined remaining time period to a specific point in time associated with the journey, wherein the specific point in time is an estimate of a time of arrival for the ongoing journey acquired from a navigation system of the vehicle.

6. The method of claim 1, wherein predicting whether provisioning of all service sections that can be provided by already downloaded computer software using high-resolution rendering will be finalized before the ongoing journey of the vehicle is completed is based on a gaming progress within the current service section and/or within one or more previous service sections.

7. The method of claim 1, wherein determining the extent of the computer software for the selected computer game for downloading further comprises predicting whether provisioning of the current service section will be finalized before downloading of computer software required for provisioning of a subsequent service section using high-resolution rendering can be completed; and
   wherein downloading computer software required for provisioning of the further service section comprises, when it is predicted that provisioning of the current service section will be finalized before downloading of computer software required for provisioning of the subsequent service section using high-resolution rendering can be completed, downloading the computer software required for provisioning of the subsequent service section using low-resolution rendering.

8. The method of claim 7, wherein downloading computer software required for provisioning of the further service section further comprises, when it is predicted that provisioning of the current service section will not be finalized before downloading of computer software required for provisioning of the subsequent service section using high-resolution rendering can be completed, downloading the computer software required for provisioning of the further service section using high-resolution rendering.

9. The method of claim 7, wherein predicting whether provisioning of the current service section will be finalized before downloading of computer software required for provisioning of the subsequent service section using high-resolution rendering can be completed is based one or more of a downloading speed, route information for the ongoing journey provided by a navigation system of the vehicle, and a gaming progress within the current service section and/or within one or more previous service sections.

10. The method of claim 1,
   wherein determining the extent of the computer software for the selected computer game for downloading further comprises, during provisioning of the current service section using low resolution rendering, predicting whether provisioning of the current service section will be finalized before downloading of computer software required for provisioning of the current service section using high-resolution rendering can be completed; and wherein downloading computer software required for provisioning of the further service section comprises, when it is predicted that provisioning of the current service section will be finalized before downloading of computer software required for provisioning of the current service section using high-resolution rendering can be completed, downloading computer software required for provisioning of the further service section using low-resolution rendering.

11. The method of claim 10, wherein downloading computer software required for provisioning of the further service section further comprises, when it is predicted that provisioning of the current service section will not be finalized before downloading of computer software required for provisioning of the current service section using high-resolution rendering can be completed, downloading computer software required for provisioning of the current service section using high-resolution rendering.

12. The method of claim 1, further comprising:
downloading computer software required for provisioning of an initial service section of the selected computer game using low resolution rendering; and
initiating provisioning of the initial service section.

13. The method of claim 12, further comprising, after initiating provisioning of the initial service section, downloading computer software required for provisioning of the initial service section using high-resolution rendering.

14. The method of claim 1, wherein the time information comprises one or more of: a total duration of the journey, a remaining duration of the journey, a starting time of the journey, an ending time of the journey, an estimated total duration of the journey, an estimated remaining duration of the journey, an estimated starting time of the journey, and an estimated ending time of the journey.

15. The method of claim 1, wherein the specific point in time is an estimate of a time of arrival for the ongoing journey.

16. The method of claim 1, wherein the time information and/or the specific point in time is acquired from a navigation system of the vehicle.

17. A non-transitory computer readable medium storing a computer program comprising program instructions, the computer program being loadable into a data processing unit and configured to cause execution of the method according to claim 1 when the computer program is run by the data processing unit.

18. A control unit for a gaming device, the control unit configured to cause execution of the method according to claim 1.

19. An apparatus for a gaming device of a vehicle, wherein the gaming device is configured to provide computer games, and wherein computer software for the computer games is available for downloading from one or more remote storing devices, wherein the apparatus comprises controlling circuitry configured to:
acquire time information of an ongoing journey;
acquire an indication of a selected computer game for the ongoing journey;
determine, based on the time information of the ongoing journey, of a remaining time period to a specific point in time associated with the ongoing journey; and
determine, based on the remaining time period to the specific point in time associated with the ongoing journey, of an extent of the computer software for the selected computer game for downloading, wherein the determined extent of the computer software comprises of one or more of a game engine, a computer software part for a game level, content or assets, and the determined extent of the computer software being that which is needed by the gaming device to effectuate game play of the selected game by a user during the remaining time period, wherein each computer game comprises two or more service sections, and wherein the controlling circuitry is configured to cause determination of the extent of the computer software for the selected computer game for downloading by causing:
during provisioning of a current service section of the selected computer game, prediction of whether provisioning of all service sections that can be provided by already downloaded computer software using high-resolution rendering will be finalized before an ongoing journey of the vehicle is completed; and
when it is predicted that provisioning of all service sections that can be provided by already downloaded computer software using high-resolution rendering will be finalized before the ongoing journey of the vehicle is completed, determination of the extent of the computer software for the selected computer game for downloading as computer software required for provisioning of a further service section of the selected computer game; and
the controlling circuitry being further configured to cause downloading of the computer software required for provisioning of the further service section of the selected computer game.

* * * * *